(12) United States Patent
Freiburger et al.

(10) Patent No.: US 11,085,804 B2
(45) Date of Patent: *Aug. 10, 2021

(54) MEASURING ADAPTER ASSEMBLY FOR CLOSED LOOP FLUID TRANSFER SYSTEM

(71) Applicant: BERICAP Holding GmbH, Budenheim (DE)

(72) Inventors: Benjamin Freiburger, Yoder, IN (US); Brock Holley, Fort Wayne, IN (US); Thomas Headley, Roanoke, IN (US); Matthew Gevers, Fort Wayne, IN (US)

(73) Assignee: BERICAP Holding GmbH, Budenheim (DE)

( * ) Notice: Subject to any disclaimer, the term of this patent is extended or adjusted under 35 U.S.C. 154(b) by 24 days.

This patent is subject to a terminal disclaimer.

(21) Appl. No.: 16/521,812

(22) Filed: Jul. 25, 2019

(65) Prior Publication Data

US 2019/0346301 A1 Nov. 14, 2019

Related U.S. Application Data

(63) Continuation of application No. 15/598,896, filed on May 18, 2017, now Pat. No. 10,365,141.

(Continued)

(51) Int. Cl.
*G01F 11/28* (2006.01)
*G01F 11/38* (2006.01)
(Continued)

(52) U.S. Cl.
CPC ............. *G01F 11/28* (2013.01); *B01F 5/04* (2013.01); *B01F 15/04* (2013.01); *G01F 11/006* (2013.01);
(Continued)

(58) Field of Classification Search
CPC .......... G01F 11/28; G01F 11/38; G01F 11/44; G01F 11/32; G01F 11/006; B01F 5/04;
(Continued)

(56) References Cited

U.S. PATENT DOCUMENTS

| 1,654,429 A | 12/1927 | Peaden |
| 4,081,006 A * | 3/1978 | Crowell .................. B67B 7/26 |
| | | 141/330 |

(Continued)

FOREIGN PATENT DOCUMENTS

| CN | 104107141 A | 10/2014 |
| CN | 204170096 U | 2/2015 |

(Continued)

OTHER PUBLICATIONS

International Search Report and Written Opinion of the International Searching Authority; dated Aug. 14, 2017.‡

(Continued)

*Primary Examiner* — Nicolas A Arnett
(74) *Attorney, Agent, or Firm* — Barnes & Thornburg LLP (57) ABSTRACT

A measuring a closed-loop fluid transfer system is provided that includes a measuring adapter having a first end and a second ends, and a chamber located there between and configured to hold a volume of fluid. The measuring adapter includes a first receiving valve assembly located at the first end of the measuring adapter. The first receiving valve assembly includes a receiving valve member, at least a portion of which is separable from a portion of the first receiving valve assembly. This creates an opening that provides fluid communication to the chamber when a force is exerted on the receiving valve member of the first receiving valve assembly. A second valve assembly located at the second end of the measuring adapter includes a valve (Continued)

member. At least a portion of the valve member of the second valve assembly is separable from a portion of the second valve assembly to create an opening that provides fluid communication to the chamber.

12 Claims, 7 Drawing Sheets

Related U.S. Application Data (60) Provisional application No. 62/339,346, filed on May 20, 2016.

(51) Int. Cl.
| | |
|---|---|
| *G01F 11/44* | (2006.01) |
| *G01F 11/32* | (2006.01) |
| *G01F 11/00* | (2006.01) |
| *B01F 5/04* | (2006.01) |
| *B01F 15/04* | (2006.01) |
| *B65D 47/24* | (2006.01) |
| *B65D 47/00* | (2006.01) |

(52) U.S. Cl.
CPC .............. *G01F 11/32* (2013.01); *G01F 11/38* (2013.01); *G01F 11/44* (2013.01); *B65D 47/00* (2013.01); *B65D 47/242* (2013.01); *B65D 47/244* (2013.01)

(58) Field of Classification Search
CPC ....... B01F 15/04; B65D 47/00; B65D 47/242; B65D 47/244
See application file for complete search history.

(56) References Cited

U.S. PATENT DOCUMENTS

| | | | | |
|---|---|---|---|---|
| 4,313,477 | A * | 2/1982 | Sebalos | B65D 83/62 |
| | | | | 141/301 |
| 4,508,173 | A ‡ | 4/1985 | Read | 142/10 |
| 4,886,193 | A * | 12/1989 | Wassilieff | B65D 47/242 |
| | | | | 222/446 |
| 5,029,624 | A ‡ | 7/1991 | McCunn | A01C 15/006 |
| | | | | 137/614.04 |
| 5,097,991 | A * | 3/1992 | Lance | G01F 11/32 |
| | | | | 222/442 |
| 5,641,012 | A * | 6/1997 | Silversides | A01C 15/006 |
| | | | | 137/846 |
| 5,937,920 | A * | 8/1999 | Simmel | B65B 1/06 |
| | | | | 141/346 |
| 5,947,171 | A * | 9/1999 | Woodruff | B65D 81/3211 |
| | | | | 141/346 |
| 5,960,840 | A * | 10/1999 | Simmel | B67D 7/0294 |
| | | | | 141/346 |
| 5,996,653 | A * | 12/1999 | Piccinino, Jr. | B67D 1/1247 |
| | | | | 141/346 |
| 6,170,543 | B1 * | 1/2001 | Simmel | B67D 7/0294 |
| | | | | 141/346 |
| 6,220,482 | B1 * | 4/2001 | Simmel | B67B 7/26 |
| | | | | 141/329 |
| 6,418,987 | B1 * | 7/2002 | Colasacco | B65B 39/001 |
| | | | | 141/319 |
| 6,796,343 | B2 * | 9/2004 | Kelsey | B67D 7/344 |
| | | | | 141/354 |
| 7,121,437 | B2 * | 10/2006 | Kasting | B65D 47/242 |
| | | | | 222/482 |
| 7,392,922 | B2 ‡ | 7/2008 | Vanstaan | B25C 1/08 |
| | | | | 222/40 |
| 7,546,857 | B2 * | 6/2009 | Chadbourne | B67D 1/0835 |
| | | | | 137/614.04 |
| 7,686,194 | B2 ‡ | 3/2010 | Kasting | B65D 47/24 |
| | | | | 215/330 |
| 8,573,440 | B2 * | 11/2013 | Wollach | G01F 11/023 |
| | | | | 222/1 |
| 8,925,593 | B2 * | 1/2015 | Lamboux | B65B 3/06 |
| | | | | 141/18 |
| 10,189,614 | B2 * | 1/2019 | Pruiett | B65D 47/2031 |
| 10,365,141 | B2 * | 7/2019 | Freiburger | B01F 5/04 |
| 10,472,139 | B2 * | 11/2019 | Dubiel | G01F 11/288 |
| 2002/0139867 | A1 * | 10/2002 | Bulloch | B01F 15/0491 |
| | | | | 239/318 |
| 2006/0283896 | A1 | 12/2006 | Kasting | |
| 2015/0276069 | A1 * | 10/2015 | Saragosa | G01N 1/22 |
| | | | | 251/304 |

FOREIGN PATENT DOCUMENTS

| | | |
|---|---|---|
| CN | 104703574 A | 6/2015 |
| CN | 104755059 A | 7/2015 |
| DE | 9419263 | 2/1995 |
| WO | 2010009734 A1 | 1/2010 |
| WO | 2015114058 A1 | 8/2015 |

OTHER PUBLICATIONS

European Search Report: PCT/US2017033475; dated Jan. 3, 2020.
China Office Action, Translation, PCT/US 2017/80031194.3, Filing Date May 19, 2018, dated Dec. 25, 2019.
China Office Action, PCT/US 2017/80031194.3, Filing Date May 19, 2018, dated Dec. 25, 2019.
China Office Action, Translation, PCT/2017/80031194.3, dated Oct. 12, 2020.
China Office Action, PCT/US 2017/80031194.3, dated Oct. 12, 2020.

\* cited by examiner
‡ imported from a related application

MEASURING ADAPTER ASSEMBLY FOR CLOSED LOOP FLUID TRANSFER SYSTEM

RELATED APPLICATIONS

The present Application is a continuation of application Ser. No. 15/598,896 filed on May 18, 2017, entitled "Measuring Adapter Assembly For Closed Loop Fluid Transfer System" and claims priority to U.S. Provisional Patent Application, Ser. No. 62/339,346 filed on May 20, 2016, entitled "Accessories For Closed Loop Fluid Transfer System," To the extent not included below, the subject matter disclosed in those Applications is hereby expressly incorporated into the present Application.

TECHNICAL FIELD AND SUMMARY

The present disclosure relates to closed loop fluid transfer mechanisms, and particularly to accessories that can meter a volume of fluid being transferred between a supply container and a receiving container.

Due to the dangers of certain chemical fluids, it is sometimes necessary to limit the fluids' ability to come into contact with any person or thing prior to its intended use. In some instances, however, such fluids need to be transferred from one container to another. For example, instances may arise where a hazardous fluid may need to be transferred from a bottle into a tank. This is why closed loop fluid transfer systems have been developed over the years. These systems include dispensing caps with valves that attach to the dispensing and receiving containers to effectuate transfer between same without any fluid exiting the connection between the containers. Such systems prevent opening the dispensing container until it connects with the receiving container.

Accordingly, an illustrative embodiment of the present disclosure is directed to a measuring system for a closed-loop fluid transfer system that comprises a measuring adapter having a first end and a second end, and a chamber located between the first and second ends configured to hold a volume of fluid; the measuring adapter further includes a first receiving valve assembly located at the first end of the measuring adapter, wherein the first receiving valve assembly includes a receiving valve member; wherein at least a portion of the receiving valve member of the first receiving valve assembly is separable from a portion of the first receiving valve assembly on the measuring adapter to create an opening that provides fluid communication to the chamber when a force is exerted on the receiving valve member of the first receiving valve assembly of the measuring adapter; a first container; wherein the first container includes a first valve assembly located at an end of the first container, wherein the first valve assembly on the first container includes a valve member; wherein the valve member of the first valve assembly of the first container engages the receiving valve member of the first receiving valve assembly of the measuring adapter, and the first valve assembly is selectively rotated which linearly moves the valve member of the first valve assembly to exert a linear force on the receiving valve member of the first receiving valve assembly of the measuring adapter and moves the receiving valve member of the first receiving valve assembly of the measuring adapter which provides fluid communication between both the chamber of the measuring adapter and interior of the first container; wherein the measuring adapter includes a second valve assembly located at the second end of the measuring adapter, wherein the second valve assembly includes a valve member; wherein at least a portion of the valve member of the second valve assembly located at the second end of the measuring adapter is separable from a portion of the second valve assembly to create an opening that provides fluid communication to the chamber; a second container; wherein the second container includes a second receiving valve assembly that includes a receiving valve member; wherein at least a portion of the receiving valve member on the second receiving valve assembly of the second container is separable from a portion of the second receiving valve assembly of the second container to create an opening that provides fluid communication interior of the second container when a force is exerted on the receiving valve member of the second receiving valve assembly; wherein the valve member of the second valve assembly of the measuring adapter engages the receiving valve member of the second receiving valve assembly of the second container, and the second valve assembly of the measuring adapter is selectively rotated which linearly moves the valve member of the second valve assembly which exerts a linear force on the receiving valve member of the second receiving valve assembly of the second container and moves the receiving valve member of the second receiving valve assembly of the second container which provides fluid communication between both the chamber of the measuring adapter and the interior of the second container.

In the above and other illustrative embodiments, the closed-loop fluid transfer system may further comprise: rotation of the first valve assembly on the first end of the first container produces fluid communication between the first container and the measuring adapter without opening the second valve assembly on the second end of the measuring adapter; and rotation of the second valve assembly on the second end of the measuring adapter produces fluid communication between the measuring adapter and the second container without opening the first receiving valve assembly on the first end of the measuring adapter; the measuring adapter includes graduation indicia; and the graduation indicia is located on a wall of the measuring adapter.

Another illustrative embodiment of the present disclosure is directed to a measuring system for a closed-loop fluid transfer system that comprises: a measuring adapter having a first end and a second end, and a chamber located between the first and second ends configured to hold a volume of fluid; wherein the measuring adapter includes a first receiving valve assembly located at the first end of the measuring adapter, wherein the first receiving valve assembly includes a receiving valve member; wherein at least a portion of the receiving valve member of the first receiving valve assembly is separable from a portion of the first receiving valve assembly on the measuring adapter; a first container; wherein the first container includes a first valve assembly located at an end of the first container, wherein the first valve assembly on the first container includes a valve member; wherein the valve member of the first valve assembly of the first container engages the receiving valve member of the first receiving valve assembly of the measuring adapter, and the first valve assembly is selectively rotated which linearly moves the valve member of the first valve assembly to exert a linear force on the receiving valve member of the first receiving valve assembly of the measuring adapter and moves the receiving valve member of the first receiving valve assembly of the measuring adapter; wherein the measuring adapter includes a second valve assembly located at the second end of the measuring adapter, wherein the second valve assembly includes a valve member; wherein at least a portion of the valve member of the second valve assembly located at the second end of the measuring adapter is separable from a portion of the second valve assembly; a second container; wherein the second container includes a second receiving valve assembly that includes a receiving valve member; wherein at least a portion of the receiving valve member on the second receiving valve assembly of the second container is separable from a portion of the second receiving valve assembly of the second container; wherein the valve member of the second valve assembly of the measuring adapter engages the receiving valve member of the second receiving valve assembly of the second container, and the second valve assembly of the measuring adapter is selectively rotated which linearly moves the valve member of the second valve assembly which exerts a linear force on the receiving valve member of the second receiving valve assembly of the second container and moves the receiving valve member of the second receiving valve assembly of the second container; wherein rotation of the first valve assembly on the first end of the first container produces fluid communication between the first container and the measuring adapter without opening the second valve assembly on the second end of the measuring adapter; and wherein rotation of the second valve assembly on the second end of the measuring adapter produces fluid communication between the measuring adapter and the second container without opening the first receiving valve assembly on the first end of the measuring adapter.

In the above and other illustrative embodiments, the closed-loop fluid transfer system may further comprise: when the portion of the receiving valve member of the first receiving valve assembly separates from the portion of the first receiving valve assembly an opening is created that provides fluid communication to the chamber; the portion of the receiving valve member of the first receiving valve assembly separates from the portion of the first receiving valve assembly on the measuring adapter when a force is exerted on the receiving valve member of the first receiving valve assembly of the measuring adapter; the first valve assembly is selectively rotated which linearly moves the valve member of the first valve assembly to exert a linear force on the receiving valve member of the first receiving valve assembly of the measuring adapter and moves the receiving valve member of the first receiving valve assembly of the measuring adapter which provides fluid communication between both the chamber of the measuring adapter and interior of the first container; when the portion of the valve member of the second valve assembly located at the second end of the measuring adapter separates from the portion of the second valve assembly an opening is created that provides fluid communication to the chamber; when the receiving valve member on the second receiving valve assembly of the second container separates from the portion of the second receiving valve assembly of the second container an opening is created that provides fluid communication interior of the second container when a force is exerted on the receiving valve member of the second receiving valve assembly; and when the second valve assembly of the measuring adapter is selectively rotated the receiving valve member of the second receiving valve assembly of the second container moves to provide fluid communication between both the chamber of the measuring adapter and the interior of the second container.

Another illustrative embodiment of the present disclosure is directed to a measuring system for a closed-loop fluid transfer system that comprises: a measuring adapter having a first end and a second end, and a chamber located between the first and second ends configured to hold a volume of fluid; wherein the measuring adapter includes a first receiving valve assembly located at the first end of the measuring adapter, wherein the first receiving valve assembly includes a receiving valve member; wherein at least a portion of the receiving valve member of the first receiving valve assembly is separable from a portion of the first receiving valve assembly on the measuring adapter to create an opening that provides fluid communication to the chamber when a force is exerted on the receiving valve member of the first receiving valve assembly of the measuring adapter; wherein the measuring adapter includes a second valve assembly located at the second end of the measuring adapter, wherein the second valve assembly includes a valve member; and wherein at least a portion of the valve member of the second valve assembly located at the second end of the measuring adapter is separable from a portion of the second valve assembly to create an opening that provides fluid communication to the chamber.

In the above and other illustrative embodiments, the closed-loop fluid transfer system may further comprise: a first container, wherein the first container includes a first valve assembly located at an end of the first container, wherein the first valve assembly on the first container includes a valve member, and wherein the valve member of the first valve assembly of the first container engages the receiving valve member of the first receiving valve assembly of the measuring adapter, and the first valve assembly is selectively rotated which linearly moves the valve member of the first valve assembly to exert a linear force on the receiving valve member of the first receiving valve assembly of the measuring adapter and moves the receiving valve member of the first receiving valve assembly of the measuring adapter which provides fluid communication between both the chamber of the measuring adapter and interior of the first container; and a second container, wherein the second container includes a second receiving valve assembly that includes a receiving valve member, wherein at least a portion of the receiving valve member on the second receiving valve assembly of the second container is separable from a portion of the second receiving valve assembly of the second container to create an opening that provides fluid communication interior of the second container when a force is exerted on the receiving valve member of the second receiving valve assembly, and wherein the valve member of the second valve assembly of the measuring adapter engages the receiving valve member of the second receiving valve assembly of the second container, and the second valve assembly of the measuring adapter is selectively rotated which linearly moves the valve member of the second valve assembly which exerts a linear force on the receiving valve member of the second receiving valve assembly of the second container and moves the receiving valve member of the second receiving valve assembly of the second container which provides fluid communication between both the chamber of the measuring adapter and the interior of the second container.

Additional features and advantages of the closed-loop fluid transfer system and measuring adapter assembly will become apparent to those skilled in the art upon consideration of the following detailed description of the illustrated embodiment exemplifying the best mode of carrying out the closed-loop fluid transfer system measuring adapter assembly as presently perceived.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

The exemplification set out herein illustrates embodiments of the closed-loop fluid transfer system and measuring adapter assembly, and such exemplification is not to be construed as limiting the scope of the closed-loop fluid transfer system and measuring adapter assembly in any manner.

DISCLOSURE OF THE ILLUSTRATIVE EMBODIMENT

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but to the contrary, the intention is to cover all modifications, equivalents, and alternatives falling within the spirit and scope of the present disclosure.

Examples of connectors that have been developed to control dispensing chemical and/or hazardous fluid include U.S. Pat. No. 5,960,840 ('840 patent), Controlled Product Dispensing System, issued Oct. 5, 1999, and U.S. Pat. No. 6,170,543 ('543 patent), Controlled Product Dispensing System, issued Jan. 9, 2001, the disclosures of which are herein incorporated by reference in their entirety. They disclose closure and valve tank adaptors that facilitate direct fluid transfer from one container to another. Also known, is a volumetric inductor/eductor including U.S. patent application Ser. No. 10/103,109, titled Volumetric Inductor/Eductor, filed Mar. 21, 2002, and published as U.S. Patent Publication No. U.S. 2002/0139867 ('867 publication), the disclosure which is also herein incorporated by reference in its entirety.

An illustrative embodiment of the present disclosure provides a metering system to allow measuring a volume of fluid for transfer between a supply container and a receiving container in a closed loop system such as those disclosed in the '840 and '543 patents. In this illustrative embodiment, as shown in the elevational and exploded view of FIG. 1, a bottle valve assembly 2 and tank receiving valve 4 of the type disclosed in those previously identified patents may be attached to containers such as bottle 6 and a tank 8, respectively. It is appreciated that the actual shape, size, configuration of tank 6, and bottle 8, are illustrative only. These containers are identified and associated with different names and sizes for purposes of illustrating the structures in this disclosure. It is appreciated, however, that bottle 6 and tank 8 may be the same size and configuration or different sizes and configurations.

Figure 1:
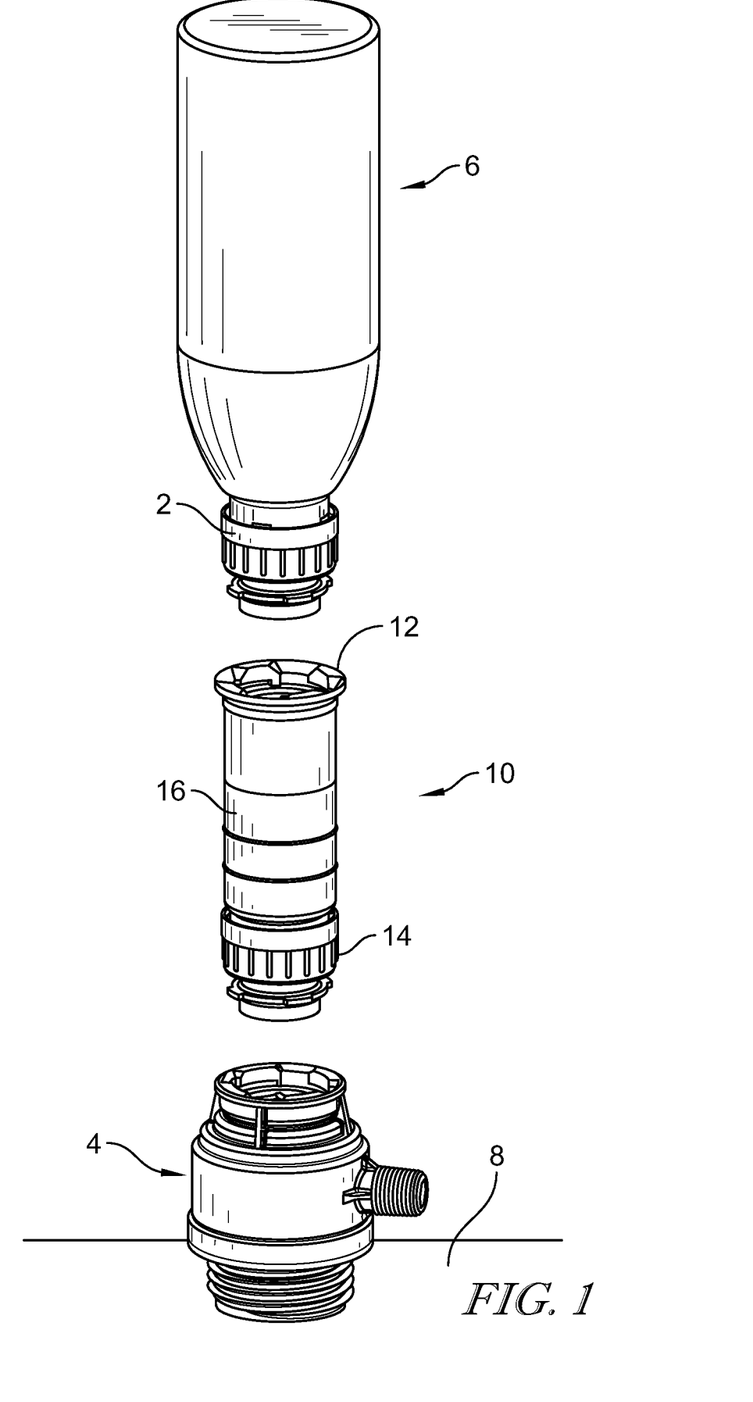
FIG. 1 is an exploded view of a closed loop fluid transfer system according to an illustrative embodiment of the present disclosure.

The transfer system includes a measuring adaptor 10 that may be coupled to valve assembly 2 and tank receiving valve 4, respectively. In the illustrated embodiment, an adapter receiving valve 12 on measuring adaptor 10 is configured to engage and actuate valve assembly 2 for connecting bottle 6 to adaptor 10. Insertion of valve assembly 2 into receiving valve 12 creates a liquid tight seal through the contacting surfaces further discussed herein. Rotating valve assembly 2 in relation to receiving valve 12 moves internal valve members (see, e.g., FIG. 5) to open the valves and create fluid communication between bottle 6 and measuring adapter 10. Rotating valve assembly 2 in the opposite direction closes the internal valve members.

Measuring adaptor 10 also includes its own valve assembly 14 configured to couple to receiving valve assembly 4 on tank 8. Inserting valve assembly 14 into receiving valve 4 creates a liquid tight seal through the contacting cylindrical surfaces. Rotating valve assembly 14 in relation to receiving valve 4 opens the internal valve members in each component (see, e.g., FIG. 7) to open the valves and create fluid communication between measuring adapter 10 and tank 8. Rotation in the opposite direction closes the valves. In an illustrative embodiment, valve assemblies 2 and 14 may have the same valving structures.

An illustrative graduated chamber 16 is located between receiving adapter 12 and valve assembly 14. Graduated chamber 16 operates to assist measuring adapter 10 to receive a measured quantity of fluid from bottle 6. That measured quantity of fluid may then be dispensed into tank 8. It is appreciated that receiving valve 12 may selectively remain closed while valve assembly 14 is opened. This allows fluid from bottle 6 to be dispensed into graduated chamber 16 without yet being dispensed into tank 8 through receiving valve 4. This is helpful when measuring concentrate from one container to be diluted in a second container. By using measuring adapter 10, the appropriate quantity of fluid may be measured prior to dispensing it into the second container. This ensures the right amount of fluid will be added to the second container before it is actually added.

In the illustrated embodiment, fluid from bottle 6 may continue flowing into cylinder 16 until a desired amount is deposited therein. With graduations exterior of cylinder chamber 16 and the cylinder itself may be transparent. An operator may visually measure the desired amount of fluid to be deposited in tank 8 without ever having to come in contact with the fluid. To that end, once the desired amount of fluid has been deposited into cylinder chamber 16, valve assembly 2 may be closed by rotating valve assembly 2 relative to receiving valve 12. This shuts-off dispensing fluid to cylinder chamber 16. Once this happens, an operator may open receiving valve 4 of tank 8 by rotating valve assembly 14 relative to receiving valve 4 (or rotate receiving valve 14 relative to valve assembly 4 in an alternate embodiment) to allow the fluid contents in graduated cylinder chamber 16 and deposit into tank 8. It will be appreciated by the skilled artisan upon reading this disclosure that valve assemblies 2 and 14 may be operated independently to allow the graduated fluid to be deposited as previously discussed, or both opened at the same time to allow fluid to pass through directly from bottle 6 to tank 8 depending on operation of the said valve assemblies 2 and 14. This is accomplished by combinations of rotating valve assembly 2 relative to receiving valve 12 and rotating valve 14 relative with respect to receiving valve 14.

Figure 2:
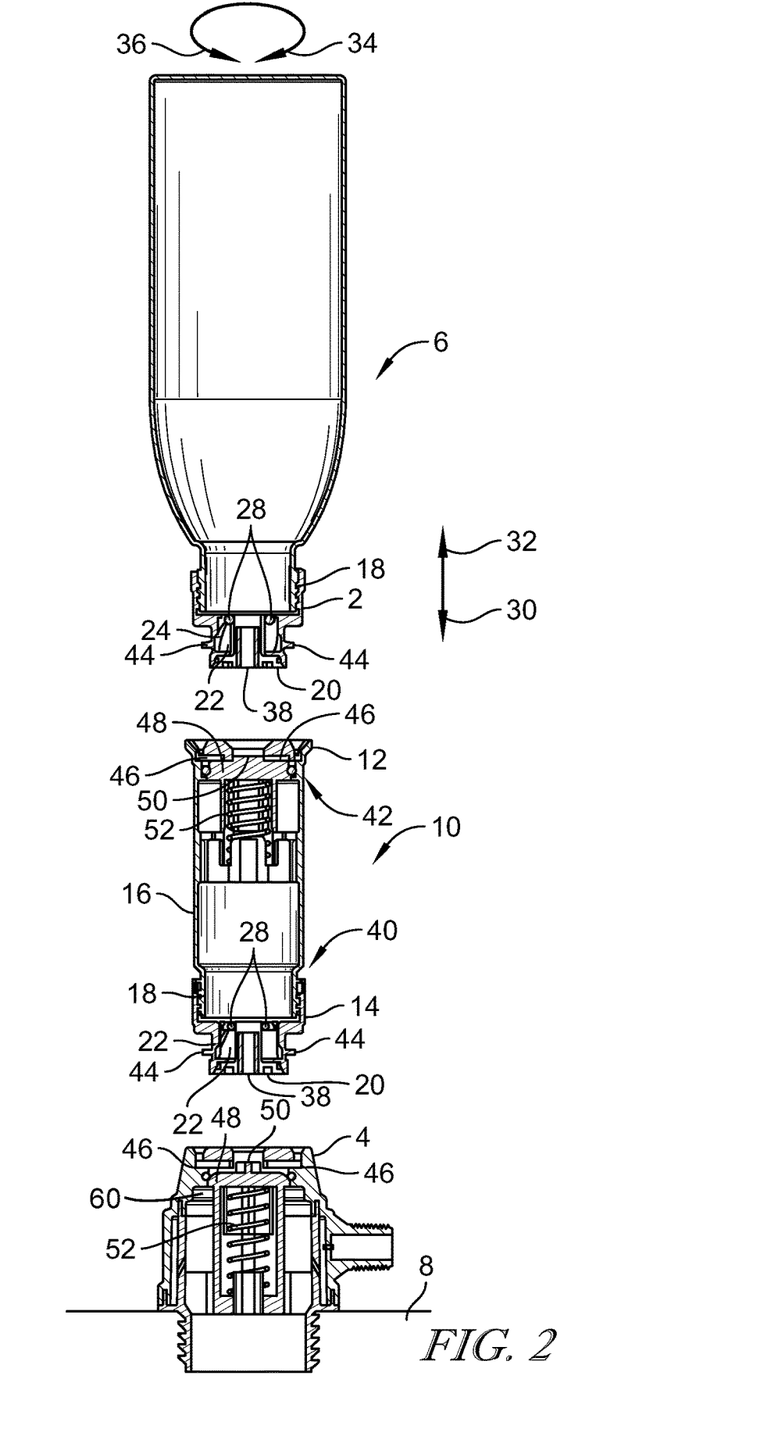
FIG. 2 is a cross-section elevational and exploded view of the closed loop fluid transfer system of FIG. 1.

A cross-sectional elevation view of bottle 6, measuring adapter 10, and tank 8 are shown in FIG. 2. This view depicts the interior structures that make up valve assemblies 2 and 14 as well as receiving valves 12 and 4. For example, valve assembly 2 is illustratively attached to bottle 6 via mating threads 18. Valve assembly 2 acts as a cap to bottle 6 preventing its contents from exiting unless valve assembly 2 is open. In that regard, valve member 20 selectively covers opening 22 of valve assembly 2. Along the periphery of opening 22 are helical slots 24 (see, also, FIG. 5) configured to receive fingers 28 that are part of valve member 20. Valve assembly 2 includes tabs 44 spaced about its periphery. Tabs 44 are configured to engage corresponding spaced apart slots 46 in receiving valve 12 to couple bottle 6 to measuring adapter 10. When valve member 20 is caused to rotate, fingers 28 located in corresponding helical slots 24 will move linearly in illustrative direction 30 exposing opening 22 in valve assembly 2. This means that causing valve member 20 to rotate, such as in directions 34, 36, will move valve member 20 linearly in directions 30 or 32 between open and closed positions.

A receptacle 38 is disposed in valve member 20. Receptacle 38 is configured to engage pin 50 of receiving valve member 48 of receiving valve assembly 12 which, when combined with slots 46, causes valve member 20 to not rotate. Instead, bottle 6 and valve assembly 2 rotate with respect to both valve member 20 and receiving valve assembly 12. This causes valve member 20 to open which exposes opening 22 to allow fluid communication between bottle 6 and chamber 16. A skilled artisan upon reading this disclosure shall appreciate that it is possible for the remainder of valve assembly 2 (along with bottle 6) to rotate with respect to valve member 20. This will have the same effect of valve member 20 moving linearly in direction 30 or 32 as if it were the component rotating.

Illustratively, receiving valve assembly 12 is located on end 42 of measuring adapter 10. A receiving valve member 48 is biased against the periphery of receiving valve assembly 12 by a spring 52 keeping receiving valve assembly 48 in the closed and sealed condition as its normal state unless forced open otherwise. Opening receiving valve assembly 12 (see FIG. 5) may be accomplished by applying a linear force, illustratively, in direction 30 to overcome the bias of spring 52. As previously discussed, if valve member 20 is kept from rotating but bottle 6 is available to rotate, valve member 20 may be used to open receiving valve member 48 to create fluid communication between the interior of bottle 6 and chamber 16.

Tabs 44 are fitted into slots 46 and receptacle 38 couples to pin 50 allowing bottle 6 and valve assembly 2 to rotate with respect to measuring adapter 10 without valve member 20 rotating. In particular, when valve assembly 2 rotates, fingers 28 of valve member 20 follow helical slots 24 which cause valve member 20 to move linearly in direction 30. By this manual rotation of bottle 6 there is enough force to overcome the bias of receiving valve member 48, being held in the closed position, to open same. Once this happens, fluid from bottle 6 may pass through valve assembly 2 and receiving valve assembly 12 and enter chamber 16 of measuring adapter 10. Graduations on chamber 16 may be used to determine the amount of fluid from bottle 6 that should enter measuring adapter 10. Once sufficient fluid has been deposited into chamber 16, the fluid flow from bottle 6 may be terminated by rotating bottle 6 with valve assembly 2 in the opposite direction, such as direction 36. This causes fingers 28 of valve member 20 to again move along helical slots 24 but in the opposite direction which causes valve member 20 to move linearly in direction 32 to close off opening 22 in valve assembly 2 thereby shutting off the fluid flow.

End 40 of measuring adapter 10 includes valve assembly 14. Mating threads 18 couple valve assembly 14 to end 40 of measuring adapter 10 similar to mating threads that hold valve assembly 2 to bottle 6. Also similarly, valve assembly 14 includes a valve member 20, opening 22, fingers 28, receptacle 38, and helical grooves 24 that operate in the same way as the corresponding structures identified and described with respect to valve assembly 2 coupled to bottle 6. Additionally, valve assembly 14, like valve assembly 2, includes tabs 44 spaced about the illustrative periphery of valve assembly 14 and are configured to engage corresponding spaced apart slots 46 in receiving valves 4 just as tabs 44 of valve assembly 2 engage corresponding slots 46 in receiving valve 12. As discussed, this couples measuring adapter 10 to receiving adapter 4 while allowing rotation of measuring adapter 10. Valve member 20 via receptacle 38 is configured to engage pin 50 of receiving valve member 48 which, when combined with slots 46, causes valve member 20 to not rotate, but instead allow measuring adapter 10 and valve assembly 14 to rotate with respect to both valve member 20 and receiving valve assembly 4. As also previously discussed, this causes valve member 20 to move in illustrative direction 30 which opens exposing opening 22 to allow fluid communication between chamber 16 and tank 8.

To dispense fluid from end 40 of measuring adapter 10, tabs 44 of valve assembly 14 may be fitted into slots 46 of receiving valve 4. Also similar to receiving valve 12, receiving valve 4 illustratively includes a spring 52. The bias's receiving valve member 48 against opening 60 of receiving valve assembly 4 thereby sealing tank 8 from the outside environment. By connecting valve assembly 14 to receiving valve assembly 4 (see, also, FIG. 6) pin 50 is inserted into receptacle 38 of valve member 20. Accordingly, similar to the operation between bottle 6 and measuring adapter 10, measuring adapter 10 can be separately fitted on to tank 8 and rotated to dispense fluid from chamber 16 into tank 8.

Rotating measuring adapter 10, illustratively in direction 34, moves measuring adapter 10 with respect to receiving valve assembly 4 (and tank 8) but valve member 20 is held in place by pin 50 of receiving valve member 48 and, therefore, does not rotate. But because the remainder of valve assembly 14 does rotate, fingers 28 of valve member 20 follow helical slots 24 causing valve member 20 to move linearly in illustrative direction 30. As previously discussed with respect to bottle 6, now rotating measuring adapter 10 produces sufficient force for valve member 20 to overcome the bias of spring 52 holding valve member 48 in its closed position to now open receiving valve assembly 4. When this happens, fluid communication is created between measuring adapter 10 and tank 8. As such, the measured quantity of fluid held in bottle 6 is dispensed (or dosed) into measuring adapter 10 can then be independently deposited into tank. 8. This allows an operator to transfer a measured amount of fluid from one container and separately deposit that measured amount of fluid into a second container using the measuring adapter 10. Because fluid that travels through such closed systems may inherently be dangerous, having control over the amount that is ultimately needed from one container to another, and deposit that fluid at a different time can be useful functions.

Figure 3:
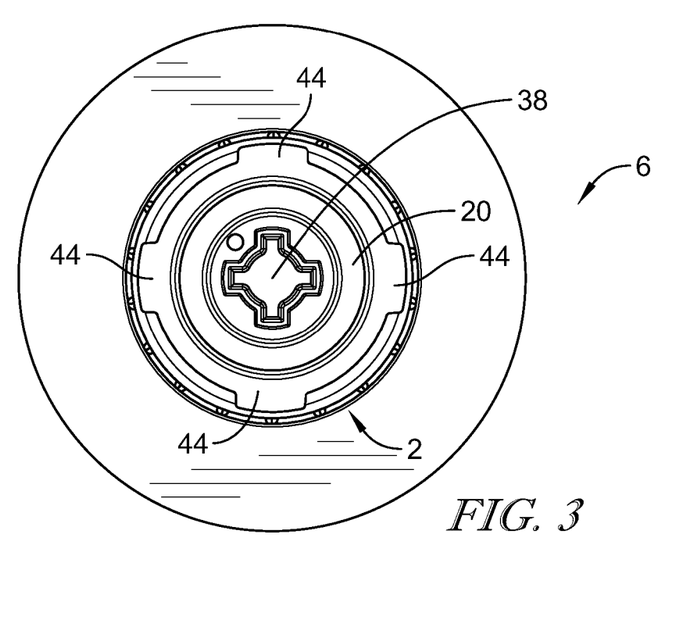
FIG. 3 is an end view of a bottle portion of the closed loop fluid transfer system.
Figure 4:
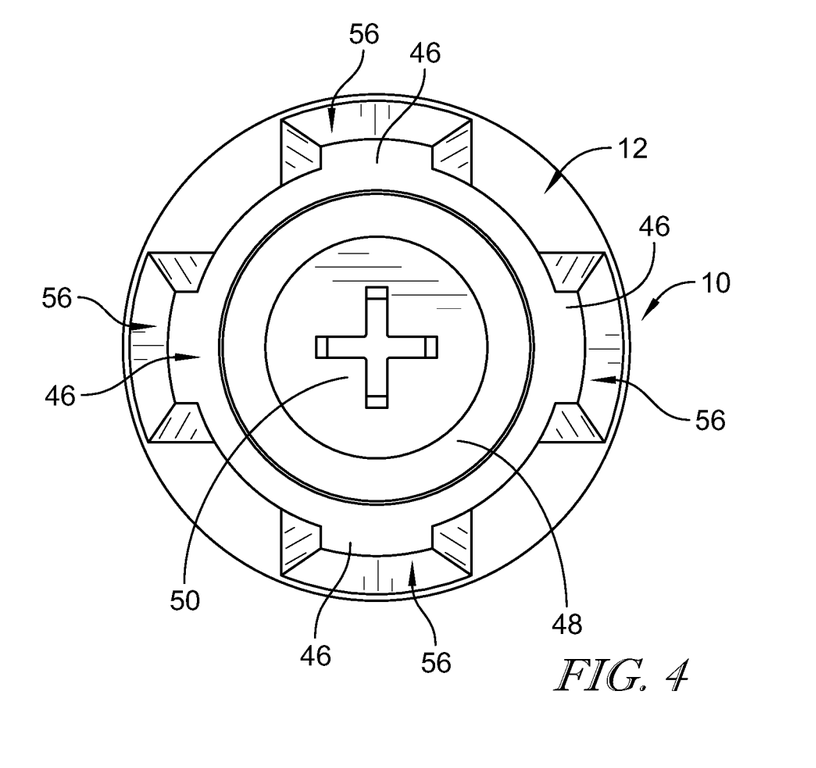
FIG. 4 is an end view of a measuring adapter portion of the closed loop fluid transfer system.

End views of bottle 6 and measuring adapter 10 are shown in FIGS. 3 and 4, respectively. These views depict the structures that may be employed to connect bottle 6 with measuring adapter 10 and allow bottle 6 to rotate with respect to measuring adapter 10 to dispense a quantity of fluid therein. Shown in FIG. 3 is valve assembly 2. In particular, this end view depicts receptacle 38 and tabs 44. Illustratively, receptacle 38 may be generally cross-shaped. This shape produces a "key" function when engaged with receiving valve member 48 so valve member 20 will not rotate even though other connected structures surrounding it rotate. Pin 50 of receiving valve member 48 is illustratively cross shape in a complementary fashion to the receptacle cross shape of receptacle 38. Pin 50 being fitted into receptacle 38 prevents valve member 20 from rotating as bottle 6 and valve assembly 2 rotates. Tabs 44 on valve assembly 2 are configured to fit into slot openings 56 which are in communication with slots 46 in receiving valve assembly 12. As will be appreciated from FIG. 2 and the other views, slots 46 extend circumferentially within receiving valve assembly 12 so that tabs 44 may be fitted in slot openings 56. Tabs 44 may then be rotated between adjacent slot openings 56 allowing assembly 2 to rotate with respect to receiving valve assembly 12. The effect of this, however, is that valve 20 will linearly push against valve 48, thereby opening both valve assemblies 2 and 12 to create the fluid communication between bottle 6 and chamber 16 of measuring adapter 10.

Figure 5:
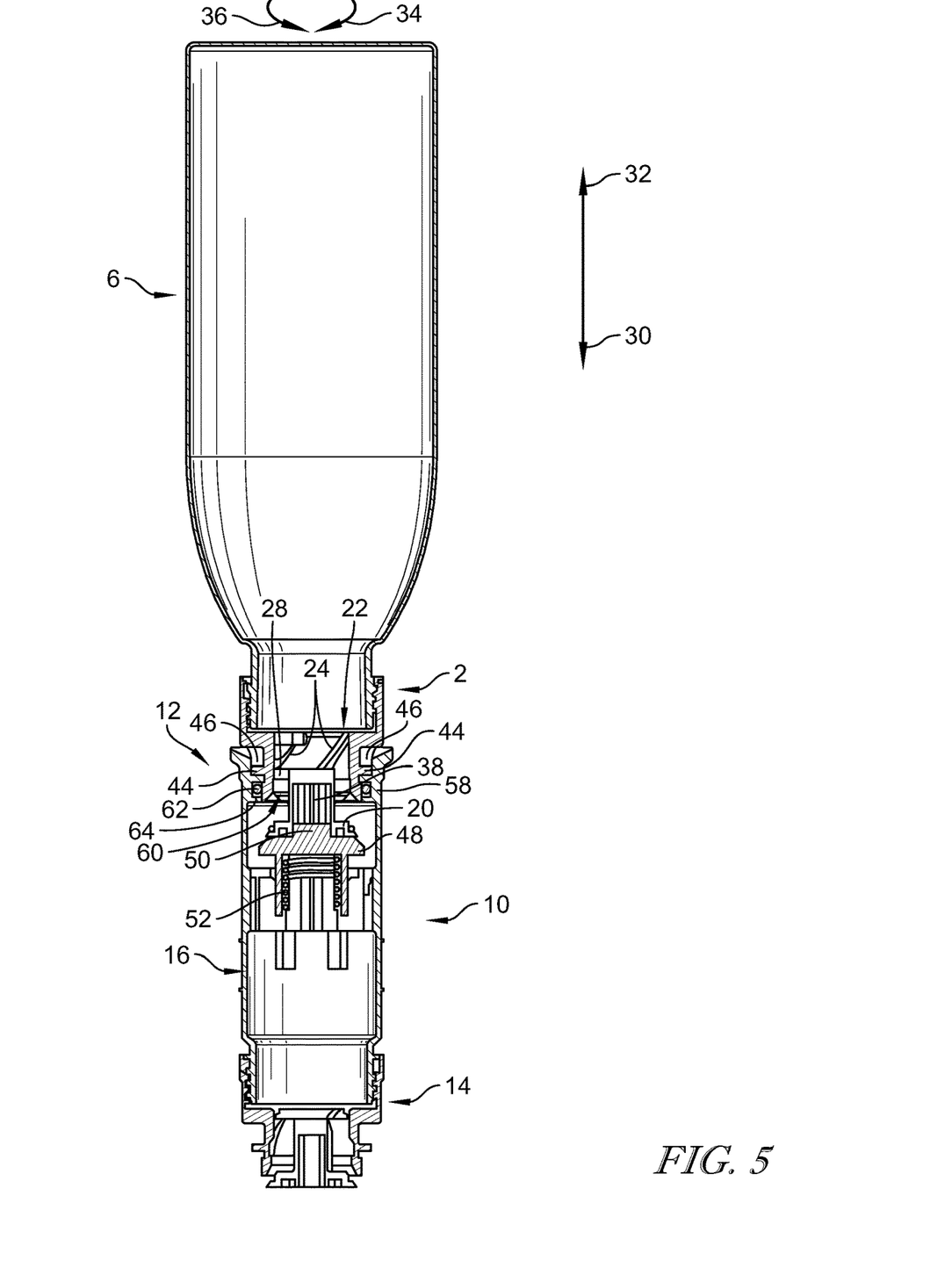
FIG. 5 is a cross-sectional elevation view of the bottle and measuring adapter portions of the closed loop fluid transfer system.

A cross-sectional elevational view of bottle 6 opening measuring adapter 10 is shown in FIG. 5. This view depicts valve assembly 2 coupled to receiving valve assembly 12 with their respective valve members 20 and 48 in the open position creating fluid communication between bottle 6 and chamber 16. As shown, receptacle 38 of valve 20 is engaged with pin 50 of valve 48 preventing valve 20 from rotating. Tabs 44 of valve assembly 2 are fitted into slots 46 of receiving valve assembly 12. Here, bottle 6 is rotated illustratively in direction 34. During this rotation, valve member 20 cannot rotate with the remainder of valve assembly 2. But valve member 20, being coupled to valve assembly 2 via fingers 28 located in helical slots 24, is linearly movable as bottle 6 and valve assembly 2 rotate. The curvature of helical slots 24 in combination with valve member 20's inability to rotate, creates the only path of movement for valve member 20 which is linear, in this case, in illustrative direction 30. The force caused by the rotation of bottle 6 is great enough to overcome the bias of spring 52 in direction 32 causing spring 52 to compress, as shown. This causes receiving valve member 48 of receiving valve assembly 12 to move in direction 30 along with valve member 20 of valve assembly 2. This moves valve member 48 away from inner periphery 58 of receiving valve assembly 12 to create opening 60 in same. This forms a fluid passageway from container 6 through opening 22 in valve assembly 2 through opening 60 and into chamber 16. In an illustrative embodiment, a gasket or o-ring 62 may be positioned at inner periphery 58 and engage outer wall 64 of valve assembly 2 to provide a seal between the valve assembly 2 and receiving valve assembly 12. This assists creating the closed system that prevents fluid from escaping from either measuring adapter 10 or bottle 6.

Figure 6:
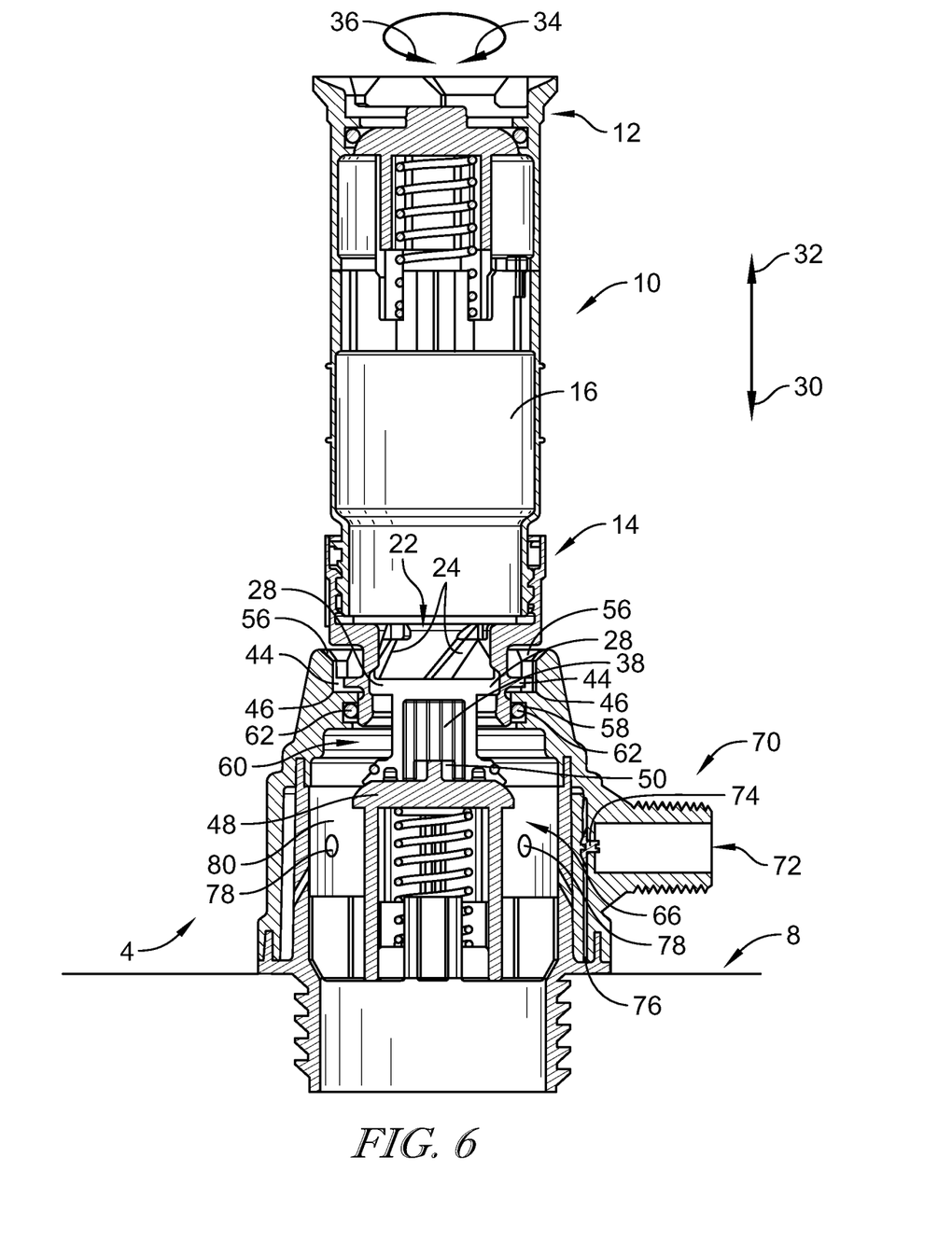
FIG. 6 is a cross-sectional elevation view of the measuring adapter and tank portions of the closed loop fluid transfer system.

A cross-sectional elevational view of measuring adapter 10 coupled to tank 8 is shown in FIG. 6. This view depicts valve assembly 14 coupled to receiving valve assembly 4 with both in the open position to create fluid passage from chamber 16 of measuring adapter 10 to tank 8. Similar to that previously discussed with respect to valve assembly 2 and receiving valve assembly 12, here valve assembly 14 also includes receptacle 38 and tabs 44, that receives pin 50 and fits into slots 46, respectively, of receiving valve assembly 4. This receptacle 38 may also be generally cross-shaped producing a "key" function when engaged with pin 50 of receiving valve member 48 so valve member 20 of valve assembly 14 will not rotate even though other connected structures surrounding it rotate. Tabs 44 on valve assembly 14 are configured to fit into slot openings 56 which are in communication with slots 46 in receiving valve assembly 12. As will be appreciated from FIG. 2 and the other views, slots 46 extend circumferentially within receiving valve assembly 4 so that tabs 44 may be fitted in slot openings 56. Pin 50 of receiving valve member 48 is illustratively cross shape in a complementary fashion to the receptacle cross shape of receptacle 38. Pin 50 being fitted into receptacle 38 prevents valve member 20 from rotating as measuring receptacle 10 and valve assembly 14 rotates. Tabs 44 may then be rotated between adjacent slot openings 56 allowing valve assembly 14 to rotate with respect to receiving valve assembly 4. During this rotation, valve member 20 cannot rotate with the remainder of valve assembly 14. But valve member 20, being coupled to valve assembly 14 via fingers 28 located in helical slots 24, is linearly movable when measuring adapter 10 and valve assembly 14 rotate. As previously discussed, the curvature of helical slots 24 in combination with valve member 20's inability to rotate creates the only path of movement for valve member 20 which is linearly in illustrative direction 30. The force caused by the rotation of measuring adapter 10 is great enough to overcome the bias of spring 52 in direction 32 causing spring 52 to compress. This causes receiving valve member 48 of receiving valve assembly 4 to move in direction 30 along with valve member 20 of valve assembly 14. This moves valve member 48 away from inner periphery 58 of receiving valve assembly 4 exposing opening 60 in same. This forms a fluid passageway from chamber 16 through opening 22 of valve assembly 14, through opening 60 of receiving valve assembly 4 and into tank 8.

In an illustrative embodiment, a gasket or o-ring 62 may be positioned at inner periphery 58 and engage outer wall 64 of valve assembly 14 to provide a seal between the valve assembly 14 and receiving valve assembly 4. The effect of this is that valve 20 will linearly push against valve 48, thereby opening both valve assemblies 14 and 4 to create the fluid communication between chamber 16 of measuring adapter 10 and tank 8. This also assists creating the closed system that prevents fluid from escaping from either measuring adapter 10 or tank 8.

It is further appreciated that receiving valve assembly 4 may include a flush valve assembly 70. Because the engagement between measuring adapter 10 and tank 8 still constitutes a closed system, and a typical purpose of dispensing fluid from measuring adapter 10 into tank 8 is to dispense concentrate, the balance of fluid added to tank 8 may often be water or other appropriate fluid. Flush valve assembly 70 allows fluids such as water from another source to be introduced into tank. 8. As illustratively shown herein, flush valve assembly 70 includes a fluid port 72 that is an communication with an illustrative umbrella valve 74. A peripheral chamber 76 is positioned between fluid port 72 and passageway 66 in receiving valve assembly 4. During operation, a hose or tube may be affixed to passageway 66 and provide a supply of water to dispense in tank 8. Umbrella valve 74, which is naturally biased to the closed position, will be pushed to an open position by the force of the fluid entering fluid port 72. This allows the fluid to then enter peripheral cavity 76. A plurality of ports 78 may be disposed about the inner wall 80 that forms passageway 66 which permits the fluid that is being forced through opening 22 into peripheral cavity 76 to enter passage passageway 66. In order to both enter tank 8, but also flush any remaining fluid, such as a concentrate, from chamber 16 and down in direction 30 and into tank 8. Illustratively, ports 78 may be directed upward so the pressurized fluid such as water is directed upward in direction 32 and moves through passageway 66, through opening 22 in valve assembly 14 to rinse out chamber 16. This will ensure as much of the fluid that was originally deposited in measuring adapter 10 is rinsed from chamber 16 and deposited into tank. 8.

Figure 7:
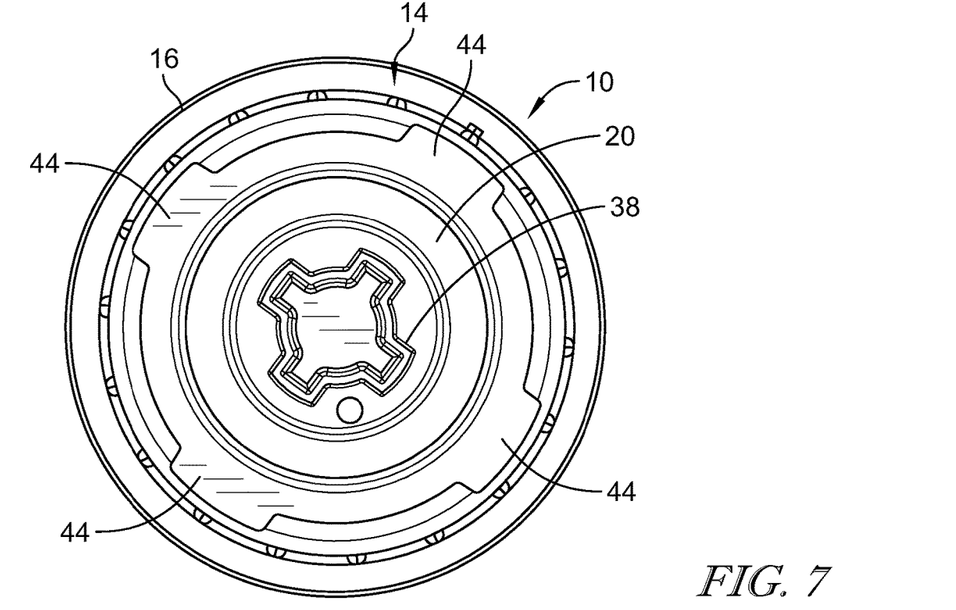
FIG. 7 is another end view of the measuring adapter portion of the closed loop fluid transfer system.
Figure 8:
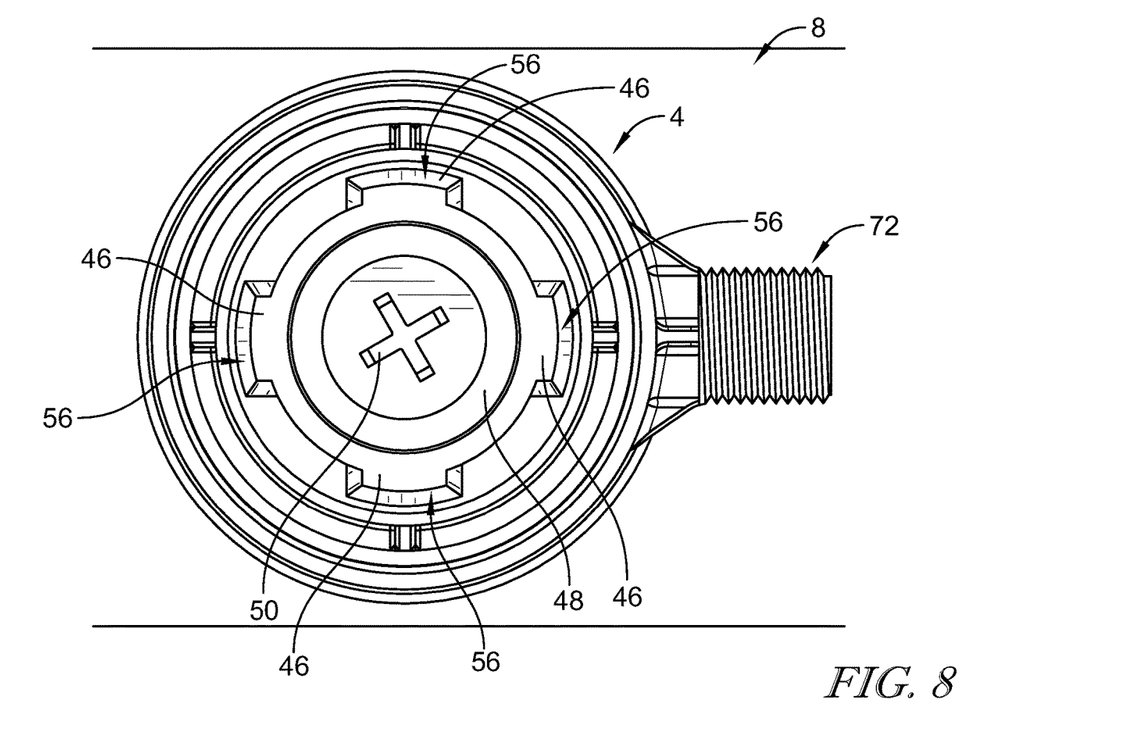
FIG. 8 is an end view of the tank portion of the closed loop fluid transfer system.

End views of measuring adapter 10 and valve assembly 4 are shown in FIGS. 7 and 8, respectively. These views depict the structures that may be employed to connect measuring adapter 10 with tank 8. As previously discussed measuring adapter 10 is rotatable with respect to valve assembly 4 to dispense the fluid from chamber 16 into tank 8. Shown in FIG. 7 are measuring adapter 10 and valve assembly 14 with receptacle 38 and tabs 44. Again, receptacle 38 of valve member 20 may be generally cross-shaped. To produce a "key" function when engaged with pin 50 so valve member 20 will not rotate even though other connected structures surrounding it rotate. Tabs 44 on valve assembly 14 are configured to fit into slot openings 56 which are in communication with slots 46 in receiving valve assembly 4. As discussed with regarding to receiving valve assembly 12, and the other views, slots 46 extend circumferentially within receiving valve assembly 4 so that tabs 44 may be fitted therein via slot openings 56. Tabs 44 of valve assembly 14 may then be rotated between adjacent slot openings 56 allowing valve assembly 14 to rotate with respect to receiving valve assembly 4.

The view in FIG. 8 includes receiving valve assembly 4 of measuring adapter 10. Pin 50 of receiving valve member 48 of receiving valve assembly 4 is illustratively cross shape in a complementary fashion to the receptacle cross shape of receptacle 38. Pin 50 being fitted into receptacle 38 prevents valve member 20 from rotating as measuring adapter 10 and valve assembly 14 rotate. Accordingly, valve 20 will linearly push against valve 48, thereby opening both valve assemblies 14 and 4 to create the fluid communication between chamber 16 of measuring adapter 10 and tank 8.

Figure 9:
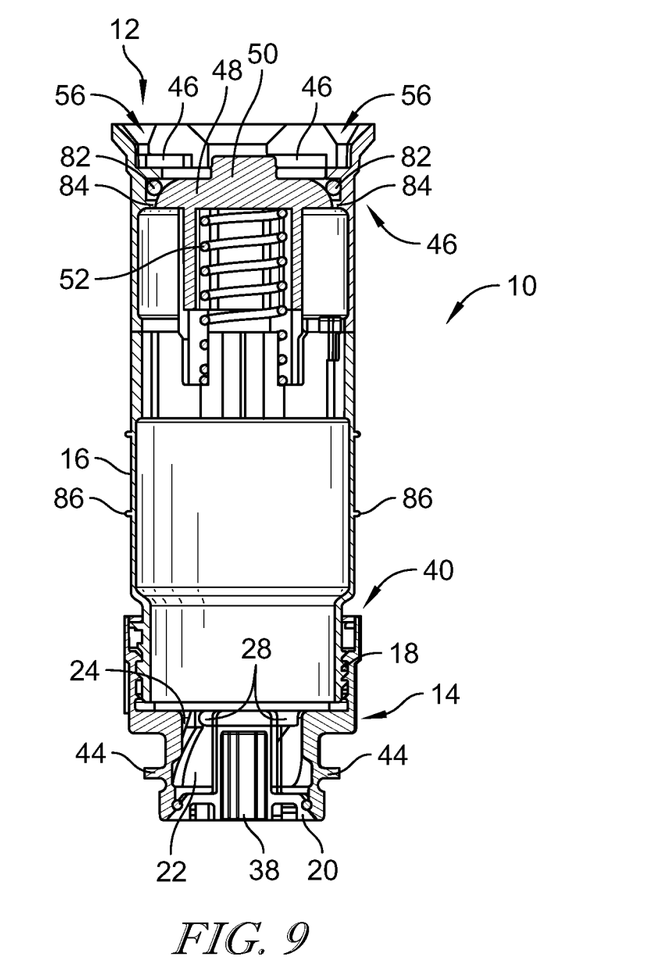
FIG. 9 is a cross-sectional elevation view of the measuring adapter.

A cross-sectional elevation view of measuring adapter 10 is shown in FIG. 9. Similar to the view in FIG. 2, this view depicts the interior structures that make up valve assemblies 12 and 14. Receiving valve assembly 12 is, again, shown located on end 42 of measuring adapter 10. Receiving valve member 48 is biased against gasket 82 of inner periphery 84 of receiving valve assembly 12 by spring 52 keeping receiving valve assembly in the closed and sealed condition as its normal state.

End 40 of measuring adapter 10, as previously discussed includes valve assembly 14. Mating threads 18 couple valve assembly 14 to end 40 of measuring adapter 10. Again, valve assembly 14 includes valve member 20, opening 22, fingers 28, receptacle 38, and helical grooves 24. Valve assembly 14, like valve assembly 2, includes tabs 44 spaced about the illustrative periphery of valve assembly 14. As discussed, this couples measuring adapter 10 to receiving adapter 4 while allowing rotation of measuring adapter 10. Valve member 20 selectively covers opening 22 of valve assembly 14. Along the periphery of opening 22 are helical slots 24 configured to receive fingers 28 that are part of valve member 20. Valve assembly 14 includes tabs 44 spaced about its periphery. Tabs 44 are configured to engage corresponding spaced apart slots 46 in receiving valve 12 to couple bottle 6 to measuring adapter 10. Graduations 86 are shown located on cylinder chamber 16. Again, these may be used to determine the amount of fluid from bottle 6 that should enter measuring adapter 10.

Additional features of the present disclosure will become apparent to those skilled in the art upon consideration of illustrative embodiments including the best mode of carrying out the disclosure as presently perceived. The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

What is claimed is:

1. A closed-loop fluid transfer system comprising:
   a measuring adapter having a first end, a second, and a chamber located between the first and second ends configured to hold a volume of fluid;
   wherein the measuring adapter further includes a receiving valve member located at the first end of the measuring adapter, wherein the receiving valve member is a first plug which is movable with respect to the measuring adapter to selectively create a first opening that provides fluid communication to the chamber, the measuring adapter also includes an exit valve member located at the second end of the measuring adapter, wherein the exit valve member is a second plug which is movable with respect to the measuring adapter to selectively create a second opening that provides fluid communication to the chamber, wherein the receiving valve member and the exit valve member are separately moveable with respect to the measuring adapter;
   wherein the receiving valve member is configured to be movable when engaged by a first movable valve member coupled to a first container wherein fluid is free to transfer from the first container into the chamber of the measuring adapter when the receiving valve member creates the first opening; and
   wherein the exit valve member is configured to be movable when engaged by a second movable valve coupled to a second container and wherein the fluid received by the first container into the chamber of the measuring adapter is dispensed into the second container when the exit valve member creates the second opening.

2. A closed-loop fluid transfer system comprising:
   a measuring adapter having a first end, a second, and a chamber located between the first and second ends configured to hold a volume of fluid;
   wherein the measuring adapter further includes a first valve member located at the first end of the measuring adapter, wherein the first valve member is a first plug which is movable with respect to the measuring adapter to selectively create a first opening that provides fluid communication to the chamber, the measuring adapter also includes a second valve member located at the second end of the measuring adapter, wherein the second valve member is a second plug which is movable with respect to the measuring adapter to selectively create a second opening that provides fluid communication to the chamber; and wherein the first valve member is spaced apart from the second valve member.

3. The closed-loop fluid transfer system of claim 2, wherein a first container includes a first valve assembly located on the first container, wherein the first valve assembly on the first container includes a valve member, wherein the valve member of the first valve assembly of the first container engages the first valve member of the measuring adapter, and the first valve assembly is selectively rotated which linearly moves the valve member of the first valve assembly to exert a linear force on the first valve member of the measuring adapter that moves the first valve member of the measuring adapter which provides fluid communication between both the chamber of the measuring adapter and interior of the first container.

4. The closed-loop fluid transfer system of claim 3, wherein a second container includes a second valve assembly that includes a valve member, wherein at least a portion of the valve member on the second valve assembly of the second container is separable from a portion of the second container to create an opening that provides fluid communication interior of the second container when a force is exerted on the valve member of the second valve assembly of the second container.

5. The closed-loop fluid transfer system of claim 4, wherein the second valve member of the measuring adapter engages the valve member on the second valve assembly of the second container, wherein the second valve member of the measuring adapter moves the valve member of the second valve assembly of the second container which provides fluid communication between both the chamber of the measuring adapter and interior of the second container.

6. The closed-loop fluid transfer system of claim 4, wherein rotation of the first valve assembly on the first container produces fluid communication between the first container and the measuring adapter without opening the second valve member on the measuring adapter; and rotation of the measuring adapter produces fluid communication between the measuring adapter and the second container without opening the first valve member on the measuring adapter.

7. The closed-loop fluid transfer system of claim 2, wherein the first and second valve members of the measuring adapter separately open and close with respect to each other.

8. The closed-loop fluid transfer system of claim 2, wherein the first valve member of the measuring adapter is configured to be movable when engaged by a first movable valve member coupled to a first container wherein fluid is free to transfer from the first container into the chamber of the measuring adapter when the first valve member of the measuring adapter creates the first opening.

9. The closed-loop fluid transfer system of claim 8, wherein the second valve member of the measuring adapter is configured to be movable when engaged by a second movable valve coupled to a second container and wherein the fluid received by the first container into the chamber of the measuring adapter is dispensed into the second container when the second valve member creates the second opening.

10. A closed-loop fluid transfer system comprising:
a measuring adapter configured to engage a first valve attached to a first container and engage a second valve attached to a second container to transfer fluid between the first and second containers, the measuring adapter includes:
a first plug located on the measuring adapter adjacent a chamber located on the measuring adapter, wherein the first plug is selectively movable with respect to the measuring adapter when engaged by the first valve to selectively create fluid communication to the chamber; and
a second plug located on the measuring adapter also adjacent the chamber located on the measuring adapter, wherein the second plug is selectively movable with respect to the measuring adapter when engaged by the second valve to selectively create fluid communication to the chamber;
wherein the first plug is spaced apart from the second plug.

11. A closed-loop fluid transfer system comprising:
a measuring adapter configured to engage a first valve attached to a first container to transfer fluid between the first container and a second container, the measuring adapter includes:
a first plug located on the measuring adapter adjacent a chamber located on the measuring adapter, wherein the first plug is selectively movable with respect to the measuring adapter when engaged by the first valve to selectively create fluid communication to the chamber;
a second plug located on the measuring adapter also adjacent the chamber located on the measuring adapter, wherein the second plug is selectively movable with respect to the measuring adapter when engaged by the second container;
wherein the chamber is sized to receive and store the fluid from the first container until the fluid is deposited in the second container; and
wherein the chamber is located between the first and second plugs.

12. A closed-loop fluid transfer system comprising:
a measuring adapter having a first end, a second, and a chamber located between the first and second ends configured to hold a volume of fluid;
wherein the measuring adapter further includes a first valve member located on the measuring adapter, wherein the first valve member is movable with respect to the measuring adapter to selectively create a first opening that provides fluid communication to the chamber, wherein the measuring adapter also includes a second valve member located on the measuring adapter, wherein the second valve member is movable with respect to the measuring adapter to selectively create a second opening that provides fluid communication to the chamber; and
wherein the second valve member is not engable with the first valve member.

* * * * *